United States Patent
Styles

(10) Patent No.: US 7,298,374 B2
(45) Date of Patent: Nov. 20, 2007

(54) SCHEME FOR PROVIDING WRINKLED LOOK IN COMPUTER SIMULATION OF MATERIALS

(75) Inventor: Andrew Graham Styles, San Diego, CA (US)

(73) Assignee: Sony Computer Entertainment America Inc., Foster City, CA (US)

(\*) Notice: Subject to any disclaimer, the term of this patent is extended or adjusted under 35 U.S.C. 154(b) by 184 days.

(21) Appl. No.: 11/195,474

(22) Filed: Aug. 2, 2005

(65) Prior Publication Data

US 2007/0030266 A1 Feb. 8, 2007

(51) Int. Cl.
*G06T 15/00* (2006.01)

(52) U.S. Cl. ............ 345/473; 345/589; 345/606; 382/11

(58) Field of Classification Search ........ 345/473–475, 345/589, 606, 582, 588; 382/111; 356/429; 703/6; 700/141
See application file for complete search history.

(56) References Cited

U.S. PATENT DOCUMENTS

| 5,504,845 | A | * | 4/1996 | Vecchione | 345/419 |
| 6,532,014 | B1 | | 3/2003 | Xu et al. | 345/673 |
| 6,909,431 | B1 | * | 6/2005 | Anderson et al. | 345/473 |
| 6,970,171 | B2 | * | 11/2005 | Baraff et al. | 345/473 |
| 7,091,977 | B2 | * | 8/2006 | Jeong et al. | 345/473 |

OTHER PUBLICATIONS

Jakobsen, Thomas; "Advanced Character Physics;" Gama Network Presents: Gamasutra.com; CMP Media Inc.; Jan. 21, 2003; pp. 1-17; (http://www.gamasutra.com/resource_guide/20030121/jacobson_01.shtml).

Malzbender, Tom et al.; "Polynomial Texture Maps;" presented at the Siggraph 2001 proceedings; May 15, 2001; pp. 1-10; (http://www.hpl.hp.com/research/ptm/papers/ptm.pdf).

Malzbender; Tom et al.; "Polynomial Texture Mapping (PTM);" Hewlett-Packard Laboratories; Research; pp. 1-2; 2001; http://www.hpl.hp.com/cgi-bin/printer-friendly.cgi.

\* cited by examiner

*Primary Examiner*—Phu K. Nguyen
(74) *Attorney, Agent, or Firm*—Fitch, Even, Tabin & Flannery

(57) ABSTRACT

Scheme for use in cloth simulation that provides a good dynamic "wrinkled" look to the cloth as it moves. The simulated area of each of the triangles in the triangle mesh is compared with the original area of the triangle to determine how much it got compressed or stretched during animation. This comparison is then used as a basis for altering the lighting of the pixels representing the triangles in order to improve the appearance of the wrinkles in the cloth. The lighting of each pixel is altered by altering a surface normal of the pixel using a value obtained from each of one or more normal maps. Normal maps are selected by using wrinkle ratios that are calculated based on the above mentioned comparisons.

20 Claims, 5 Drawing Sheets

SCHEME FOR PROVIDING WRINKLED LOOK IN COMPUTER SIMULATION OF MATERIALS

REFERENCE TO COMPUTER PROGRAM LISTING APPENDIX

The following computer program listing files are submitted on one compact disc and are incorporated herein by reference in their entirety; a duplicate copy of the compact disc is also submitted herewith:

| NAME | CREATION DATE | SIZE (bytes) |
|---|---|---|
| AxialConstraint.ccp | May 11, 2005 | 2,817 |
| AxialConstraint.h | May 11, 2005 | 928 |
| BondConstraint.ccp | May 11, 2005 | 2,583 |
| BondConstraint.h | May 11, 2005 | 1,044 |
| ClothInstance.cpp | May 27, 2005 | 13,690 |
| ClothInstance.h | May 11, 2005 | 2,839 |
| cloth-shaders.xml | May 31, 2005 | 5,705 |
| ClothTemplate.cpp | May 31, 2005 | 12,567 |
| ClothTemplate.h | May 27, 2005 | 3,109 |
| CollisionBody.cpp | May 11, 2005 | 5,410 |
| CollisionBody.h | May 11, 2005 | 2,231 |
| CylinderConstraint.cpp | Apr. 21, 2005 | 1,282 |
| CylinderConstraint.h | May 11, 2005 | 915 |
| JerseyInstance.cpp | May 11, 2005 | 303 |
| JerseyInstance.h | May 11, 2005 | 447 |
| JerseyTemplate.cpp | May 27, 2005 | 1,651 |
| JerseyTemplate.h | May 27, 2005 | 642 |
| PtxSystem.cpp | May 13, 2005 | 3,759 |
| PtxSystem.h | May 11, 2005 | 3,245 |
| ShortsInstance.cpp | May 11, 2005 | 1,732 |
| ShortsInstance.h | May 11, 2005 | 909 |
| ShortsTemplate.cpp | May 27, 2005 | 3,152 |
| ShortsTemplate.h | May 27, 2005 | 858 |
| Skeleton.cpp | Apr. 14, 2005 | 4,124 |
| Skeleton.h | May 11, 2005 | 2,184 |
| Vec3Array.cpp | May 13, 2005 | 525 |
| Vec3Array.h | May 11, 2005 | 1,697 |
| VertexConstraint.cpp | May 11, 2005 | 7,101 |
| VertexConstraint.h | May 11, 2005 | 3,475 |
| VertexProgram.txt | Jul. 21, 2005 | 10,333 |

BACKGROUND OF THE INVENTION

1. Field of the Invention

The present invention relates generally to computer graphics and animation, and more specifically to techniques for computer simulation of cloth, skin and other materials.

2. Discussion of the Related Art

Computer animation, such as is used in computer entertainment video game systems, is becoming more and more realistic. While the simulation and modeling of rigid bodies is fairly advanced, the simulation and modeling of non-rigid bodies such as cloth and clothing is still developing. Cloth is generally more difficult to simulate than rigid bodies because cloth reacts differently to forces such as wind, gravity, collisions with rigid bodies, etc.

The paper "Advanced Character Physics" by Thomas Jakobsen, dated Jan. 21, 2003 (http://www.gamasutra.com/resource_guide/20030121/jacobso n_01.shtml), which is incorporated by reference herein in its entirety, describes a Verlet integration scheme for cloth simulation. Verlet integration is a method of calculating classical physics in a way suitable to real-time simulations on computers. It is a method with more stability with larger steps in time than the equations usually used in Newtonian physics. It is most often used for molecular dynamics and real-time computer simulation of objects. A very similar method is often used as an optimized method of water ripple simulation.

It is with respect to these and other background information factors that the present invention has evolved.

SUMMARY OF THE INVENTION

The present invention advantageously addresses the needs above as well as other needs by providing a method for use in simulation of a material. The method comprises the steps of: establishing a polygon mesh for the material with each polygon in the polygon mesh having a first area equal to its area in a resting position; animating the polygon mesh, the animation resulting in each polygon in the polygon mesh having a second area; for each polygon in the polygon mesh, calculating a polygon wrinkle ratio by dividing the second area by the first area; for each vertex in the polygon mesh, calculating a vertex wrinkle ratio as an average of the polygon wrinkle ratios for each polygon attached to the vertex; and using the vertex wrinkle ratios in a process of altering lighting of pixels representing polygons in the polygon mesh.

Another embodiment of the present invention provides a system for use in simulation of a material. The system comprises: means for establishing a polygon mesh for the material with each polygon in the polygon mesh having a first area equal to its area in a resting position; means for animating the polygon mesh, the animation resulting in each polygon in the polygon mesh having a second area; means for calculating a polygon wrinkle ratio for each polygon in the polygon mesh by dividing the second area by the first area; means for calculating a vertex wrinkle ratio for each vertex in the polygon mesh as an average of the polygon wrinkle ratios for each polygon attached to the vertex; and means for using the vertex wrinkle ratios in a process of altering lighting of pixels representing polygons in the polygon mesh.

Another embodiment of the present invention provides a computer program product comprising a medium for embodying a computer program for input to a computer. A computer program is embodied in the medium for causing the computer to perform steps of: establishing a polygon mesh for a material with each polygon in the polygon mesh having a first area equal to its area in a resting position; animating the polygon mesh, the animation resulting in each polygon in the polygon mesh having a second area; for each polygon in the polygon mesh, calculating a polygon wrinkle ratio by dividing the second area by the first area; for each vertex in the polygon mesh, calculating a vertex wrinkle ratio as an average of the polygon wrinkle ratios for each polygon attached to the vertex; and using the vertex wrinkle ratios in a process of altering lighting of pixels representing polygons in the polygon mesh.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

Figure 1:
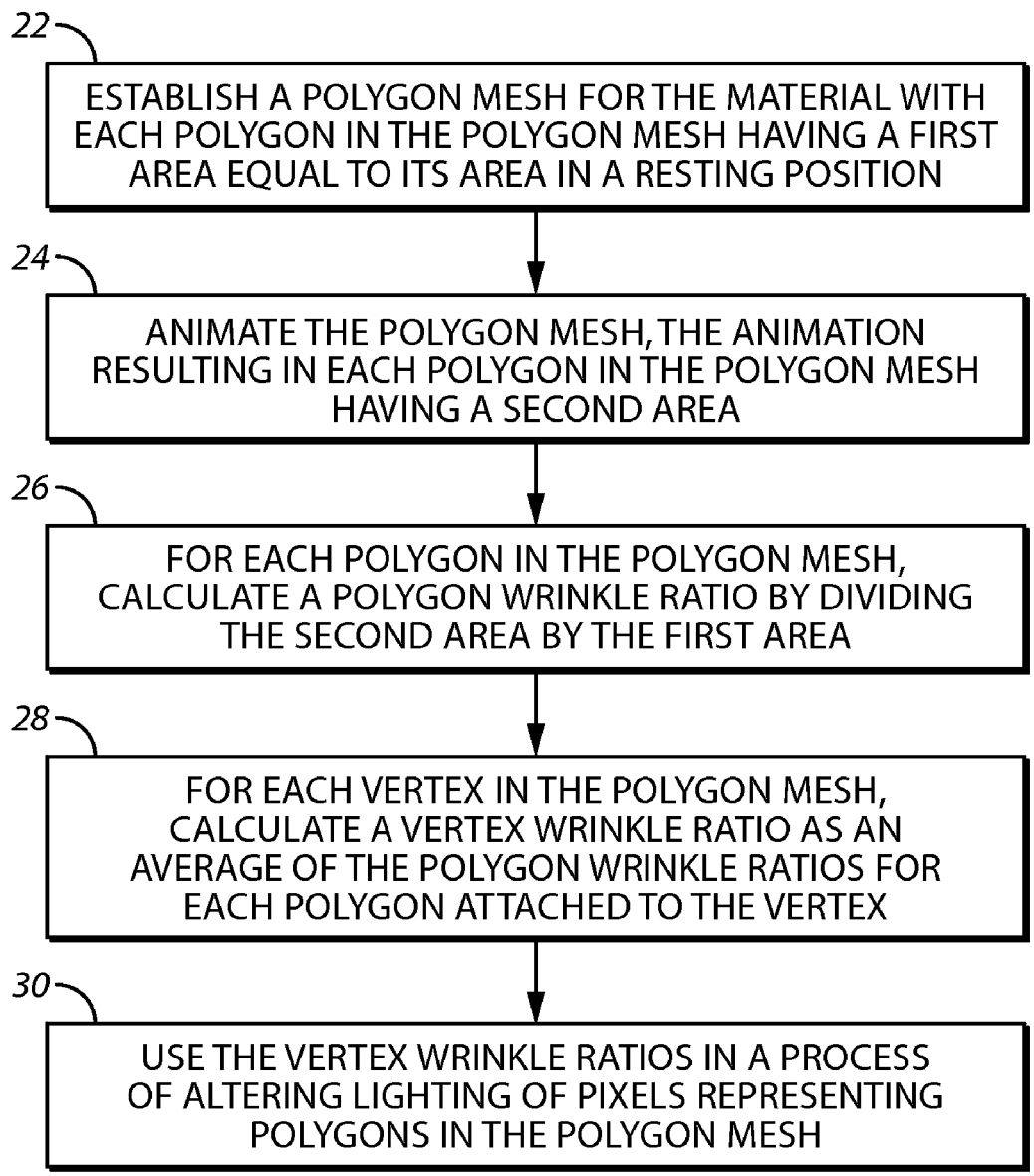
FIG. 1 is a flow diagram illustrating a method for use in the simulation of a material in accordance with an embodiment of the present invention.

It has been found by the inventor hereof that the above-mentioned Verlet integration scheme for cloth simulation, which may also be referred to herein as the Verlet cloth simulator, has a number of disadvantages. Such disadvantages become apparent when the Verlet integration scheme is used for simulating clothing on an animated character.

One such disadvantage is that in order for the Verlet cloth simulator (or any other cloth simulation scheme) to provide a good "wrinkled" look to the simulated cloth it would require many, many vertices and would be impractical on modern graphics hardware in real-time. The numerous number of vertices are required in order to provide enough fine detail for the wrinkles that are in the cloth, especially for tight wrinkles.

Embodiments of the present invention help to overcome these and other disadvantages by providing techniques that may be used in the simulation and/or movement of cloth, skin and/or other materials. Such techniques can be used in many different types of computer graphics and animation applications, such as for example graphics workstations and video game applications of the type executed by video game consoles and similar devices.

The techniques and schemes described herein improve the quality of cloth simulation by providing a good dynamic "wrinkled" look to the cloth or skin as it moves. The techniques described may be used in the real-time simulation and/or movement of materials such as for example cloth, clothing (e.g. shirts, jerseys, shorts, other garments, etc.), skin (e.g. for frowns, etc.), hair, fur, flags, etc. The techniques can be used with any existing or forthcoming material simulation technique, such as the Verlet integration scheme mentioned above, or the techniques may be used separately. The techniques and schemes are useable on today's hardware and provide very good results.

Furthermore, the techniques may be run on graphics systems which may not have random-access to main memory. Thus, once the graphics system is preloaded with the data needed, the techniques can be applied, and persistent data saved out. And the simulation may be run concurrently with other graphics tasks. On a multi processing core, the simulation can be executed on a separate processor.

The techniques described herein may be used in connection with video games having one or more animated players, such as for example a basketball video game. The clothing that a player in the basketball game typically wears comprises a shirt or jersey and a pair of shorts. Cloth simulation techniques are preferably used to make the player's clothing look as realistic as possible. The techniques described herein may be used to improve the wrinkled appearance of the player's clothing. It should be well understood that there are numerous other types of games and animations to which embodiments of the present invention may be used and applied, such as for example other types of video games, movies, videos, animations, cartoons, etc.

By way of example, the systems described herein may be built using a number of spheres to represent a player body. The spheres may be enveloped with simulated skin using any known skin simulation technique, which is sometimes referred to as skinning. The spheres then move with the movement of the player skin. Clothing may be simulated using well-known triangle mesh techniques.

A discussion of texture mapping and bump mapping will aid in the understanding of the techniques described herein. Specifically, texture mapping is the process of applying a texture, i.e. an image, to a triangle during rendering wherein the texture gets mapped onto the triangle. The surface normal of the triangle is used along with the color value in the texture to calculate the lighting equation and thus the direction of the light. A surface normal is like an arrow that points in the direction that the surface is facing in. As it angles away from a light source, the color of the pixel gets darker (and vice versa).

Bump mapping is a method wherein the flat image of a texture map is altered to give the impression of being non-smooth but without changing the physical shape of the surface. Bump mapping uses another texture map, which is sometimes called a bump map or a normal map, to change the brightness of the pixel in the main texture on the surface. Specifically, the normal map texture contains values that alter the surface normals of the original pixels. This is done by multiplying the normal from the normal map by the normal of the triangle. This gives the illusion of a bumpy surface. The surface is not really bumpy but it appears bumpy because of the changes in the lighting equation due to the change in the normal direction of the surface. It should be noted that bump mapping does not alter the position or amount of vertices in the surface.

Referring to FIG. 1, there is illustrated a method 20 that operates in accordance with an embodiment of the present invention. The method 20, which may be referred to herein as wrinkle mapping, may be used in the simulation of a material, such as clothing or any of the other materials mentioned above. In general, the method 20 takes into consideration that a cloth simulator typically distorts the area of the triangles in a triangle mesh. That is, when cloth is simulated the area of the triangles in the triangle mesh can change. The method 20 compares the current simulated area of each of the triangles with the original area of the triangle to determine how much it got compressed or stretched. This comparison is then used as a basis for altering the lighting of the pixels representing the triangles in order to improve the appearance of the wrinkles in the cloth.

Turning to the specific steps of the method 20, in step 22 a polygon mesh for a material is established with each polygon in the polygon mesh having a first area $A_R$ equal to its area in a resting position. The polygons may comprise triangles, as are typically used in cloth simulation, or any other polygon shape. In step 24 the polygon mesh is animated. The animation results in each polygon in the polygon mesh having a second area $A_A$.

The cloth mesh may be animated using any method, such as for example character skinning or cloth simulation. Any type of cloth simulation technique may be used, such as the Verlet integration scheme mentioned above, and any type of skin simulation technique may be used, many of which are known in the art. If cloth simulation is used, the polygon edges will typically compress, resulting in the area of each polygon becoming smaller as the cloth "bunches up."

Figure 3A:
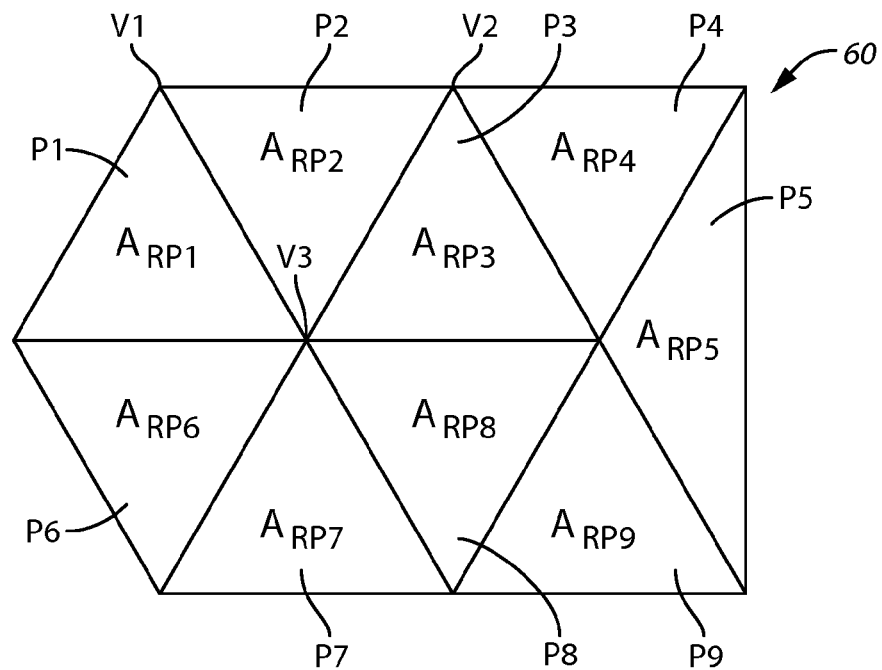
FIGS. 3A and 3B are pictorial diagrams illustrating an example application of the method shown in FIG. 1 in accordance with an embodiment of the present invention.
Figure 3B:
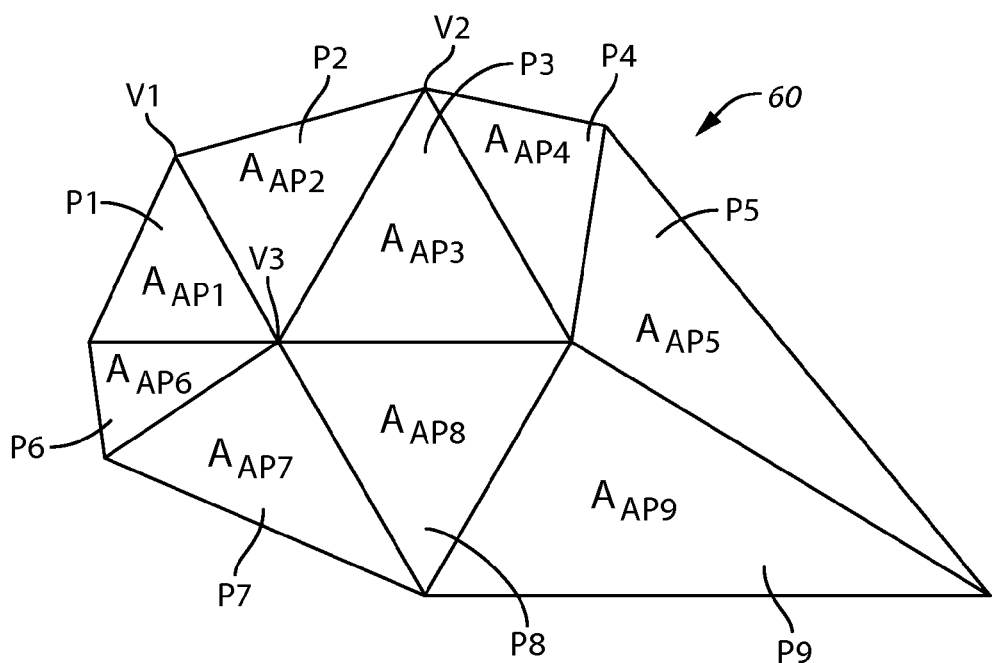

An example of steps 22 and 24 is illustrated in FIGS. 3A and 3B, which illustrates an example application of the method 20. Specifically, FIG. 3A illustrates a polygon mesh 60 in the resting position. In this example the polygons comprise triangles, but it should be well understood that the polygons may comprise any shape. The area of polygons P1, P2, P3, P4, P5, P6, P7, P8 and P9 in the resting position are indicated as $A_{RP1}$, $A_{RP2}$, $A_{RP3}$, $A_{RP4}$, $A_{RP5}$, $A_{RP6}$, $A_{RP7}$, $A_{RP8}$, and $A_{RP9}$. A few of the vertices are labeled as V1, V2, and V3.

FIG. 3B illustrates the polygon mesh 60 after it has been animated. The area of the polygons after the animation are indicated as $A_{AP1}$, $A_{AP2}$, $A_{AP3}$, $A_{AP4}$, $A_{AP5}$, $A_{AP6}$, $A_{AP7}$, $A_{AP8}$, and $A_{AP9}$. As illustrated some of the polygons have become compressed which has reduced their area, such as polygons P1, P2, P4, P6 and P7. Some of the polygons have stayed about the same size, such as polygons P3 and P8. And other polygons have been stretched which has increased their area, such as polygons P5 and P9.

As mentioned above the area of the polygons in the resting position are compared with the area of the polygons after animation. This is illustrated in the next steps of the method 20 (FIG. 1). Namely, in step 26 a polygon wrinkle ratio $WR_p$ is calculated for each polygon in the mesh by dividing the area of each polygon after animation by the area of the respective polygon in the resting pose, i.e. by dividing the second area $A_A$ by the first area $A_R$. That is:

$$WR_{Pn} = A_{APn}/A_{RPn} \quad (1)$$

If the polygon wrinkle ratio is equal to 1.0, then this indicates that the area of the polygon has not changed due to the animation step, e.g. polygons P3 and P8. That is, the area of the polygon has neither been compressed nor stretched during the animation step. If the polygon wrinkle ratio is about equal to 0.5, then this indicates that the area of the polygon has been compressed due to the animation step and will be wrinkled, e.g. polygons P2, P4 and P7. If the polygon wrinkle ratio is less than 0.5, then this indicates that the area of the polygon has been very compressed due to the animation step and will have many tight wrinkles, e.g. polygons P1 and P6. Finally, if the polygon wrinkle ratio is greater than 1.0, then this indicates that the area of the polygon has been stretched due to the animation step and will be smooth with few or no wrinkles, e.g. polygons P5 and P9.

In step 28 a vertex wrinkle ratio $WR_v$ is calculated for each vertex in the mesh as the average of the polygon wrinkle ratios for each polygon attached to the vertex. For example, for vertex V2 the vertex wrinkle ratio $WR_{V2}$ is calculated as follows:

$$WR_{V2} = (WR_{P2} + WR_{P3} + WR_{P4})/3 \quad (2)$$

This calculation is repeated for each vertex in the mesh to obtain the vertex wrinkle ratio for each vertex.

In accordance with embodiments of the present invention, the above calculations are taken into consideration when lighting the pixels that represent the material in order to improve the appearance of the wrinkles in the material. Specifically, in step 30 the vertex wrinkle ratios are used in a process of altering the lighting of the pixels representing the polygons in the polygon mesh. Changing the brightness of the pixels that represent the material can give the illusion of an improved wrinkled appearance.

One example process of altering the lighting of the pixels representing the polygons that may be used in accordance with embodiments of the present invention involves using the above-described comparison as the basis for interpolating the values of two or more different normal maps. The different normal maps will typically have different degrees of wrinkled appearance. For example, one of the different normal maps might be very loose and have only a few or a medium amount of wrinkles, the next normal map may have many very tight wrinkles, and another normal map may have a stretched appearance so that it is smooth with no wrinkles. Depending on how much the polygons get compressed, the method uses different normal maps and interpolates between them to pull different surface normals from the different maps. This results in more wrinkles appearing in the texture as the cloth compresses with a smooth transition, which provides a good dynamic "wrinkled" appearance.

Figure 2:
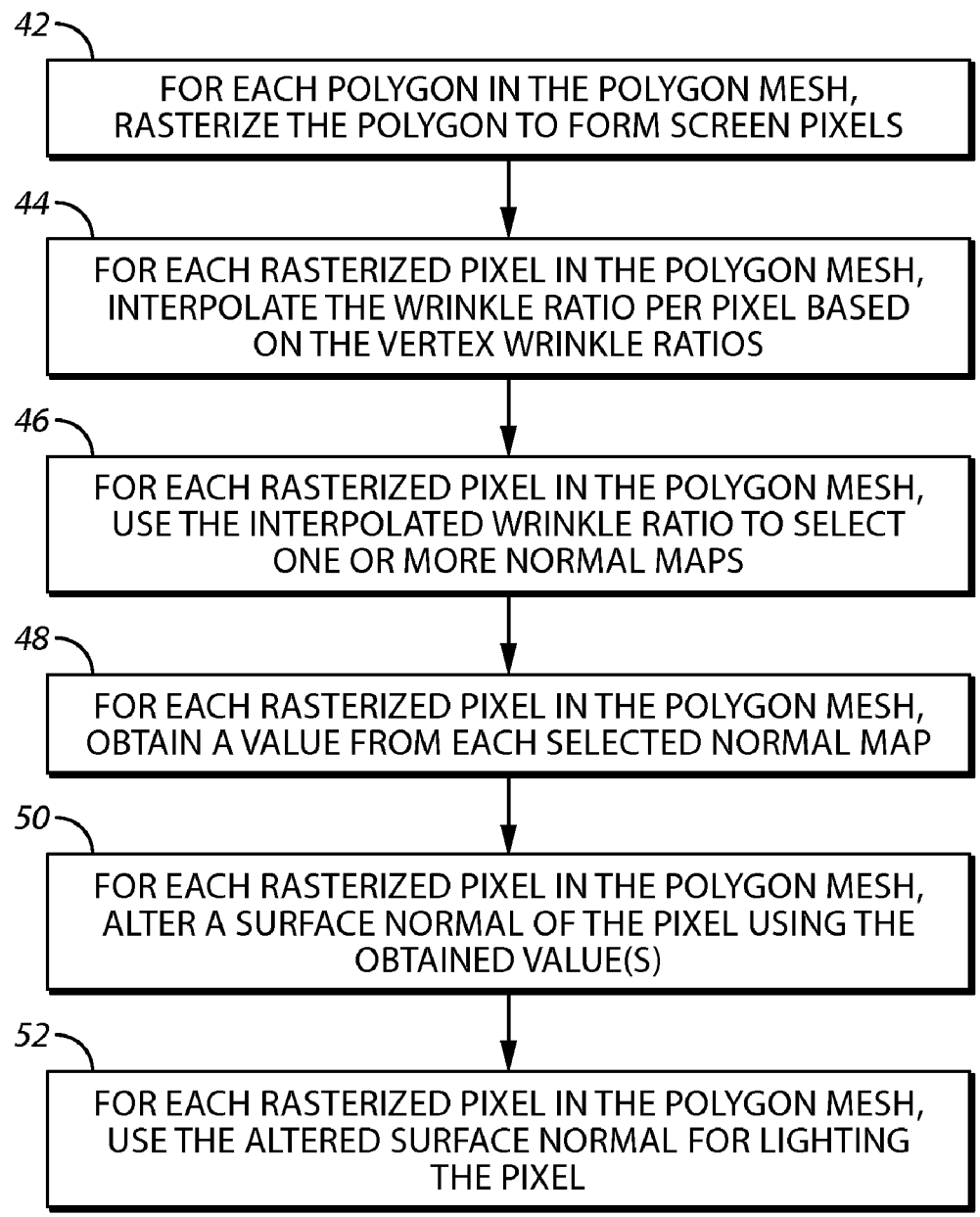
FIG. 2 is a flow diagram illustrating an example of a method that may be used with the method shown in FIG. 1 in accordance with an embodiment of the present invention.

FIG. 2 illustrates a method 40 in accordance with an embodiment of the present invention that may be used for implementing step 30 in FIG. 1. In this example process the vertex wrinkle ratios are used to select from among normal maps. Specifically, in step 42 each polygon in the polygon mesh is rasterized to form screen pixels. Then in step 44 the wrinkle ratio for each pixel is interpolated based on the vertex wrinkle ratios for the polygon. The vertex wrinkle ratios may be interpolated across each polygon by the graphics processing unit (GPU) and digital differential analysis (DDA) hardware.

Figure 4:
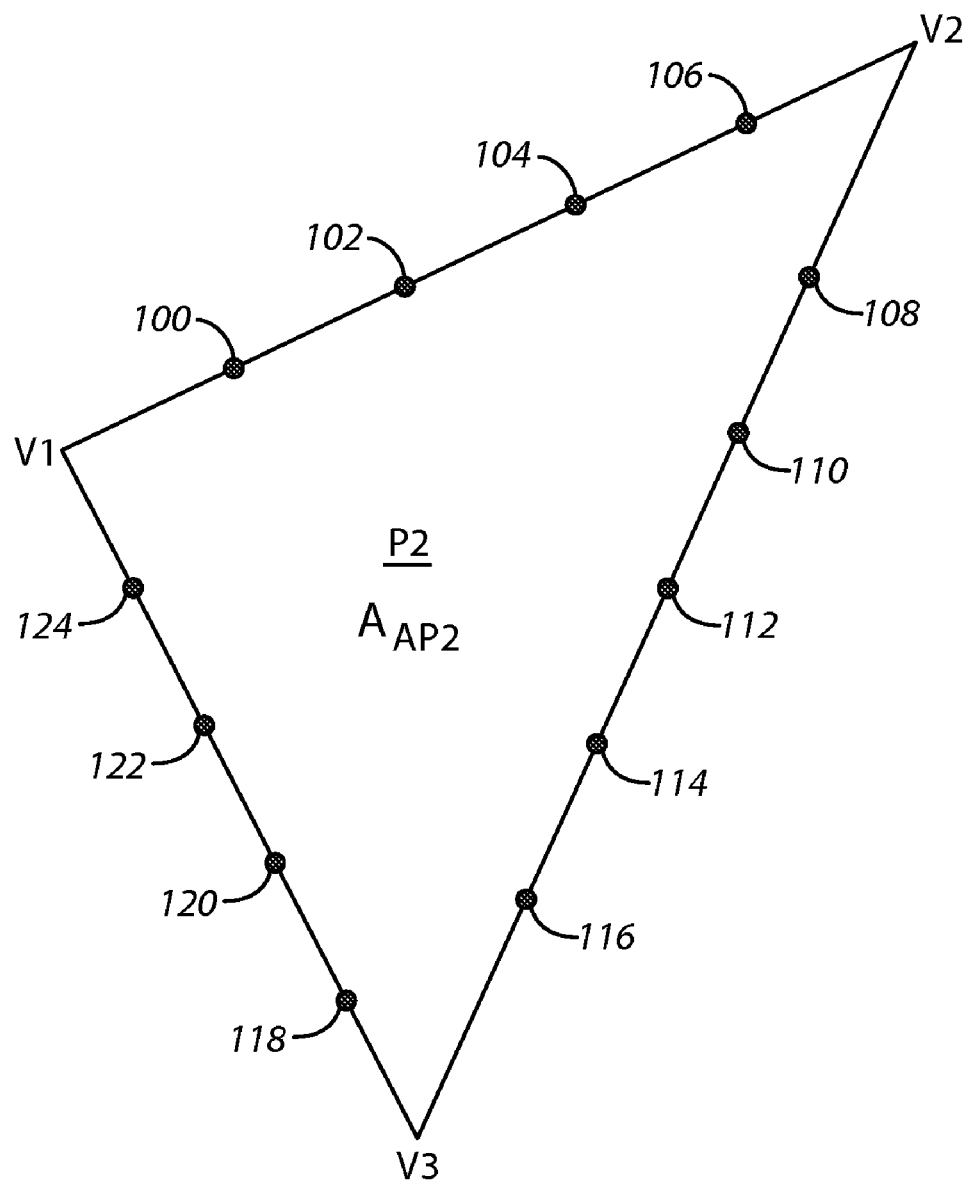
FIG. 4 is a pictorial diagram illustrating an enlarged view of a portion of the subject matter shown in FIG. 3B.

An example of steps 42 and 44 is illustrated in FIG. 4, which shows an enlarged and simplified view of polygon P2 after the animating step. As shown the rasterization step results in a number of screen pixels 100, 102, 104, 106, 108, 110, 112, 114, 116, 118, 120, 122, 124 being formed. It should be well understood that only a small number of the pixels are shown in order to simplify the explanation herein and that in an actual implementation many, many more pixels will be formed.

The vertex wrinkle ratios $WR_{V1}$, $WR_{V2}$, and $WR_{V3}$, which are known, are used to interpolate the wrinkle ratios of the rasterized pixels 100, 102, 104, 106, 108, 110, 112, 114, 116, 118, 120, 122, 124. The computer graphics hardware interpolates between the vertex wrinkle ratios when it draws the polygon. This ultimately results in a very smooth transition from areas of the cloth with no wrinkles to areas with many wrinkles. The smooth transition is due to the vertex wrinkle ratios being based on an average of the polygon wrinkle ratios of the polygons attached to the vertex.

Returning to the method 40 (FIG. 2), in step 46 the interpolated wrinkle ratio for each rasterized pixel in the polygon mesh is used to select one or more normal maps. One or more normal maps are selected by the pixel program for each pixel in order to obtain a value from each selected normal map for altering the surface normal of that pixel. An example of selecting two normal maps for each pixel will be described below.

Two or more normal maps may be used to provide varying degrees of wrinkles. For example, if two normal maps are used the first normal map may indicate the normal map of the cloth in a resting, unwrinkled position, and the second normal map may indicate a wrinkled up version of the cloth. If three normal maps are used the first normal map may be a flat, regular normal of the surface, which is not really a normal map. The second normal map may be a slightly wrinkled texture, and the third normal map may be a very wrinkled texture. In another embodiment more than three normal maps may be used.

By way of example, if the wrinkle ratio of a particular pixel is equal to 1.0, then the area of the surrounding polygons has generally not changed in the animation step. Therefore, a normal map is not really needed and the regular normal of the surface may be used instead. If the wrinkle ratio is less than 1.0, then the area of the surrounding polygons has been compressed in the animation step and a normal map having preformed wrinkles on the cloth may be used. If the wrinkle ratio is much less than 1.0, then a different normal map having many tight preformed wrinkles on the cloth may be used. And if the wrinkle ratio is greater than 1.0, then the area of the surrounding polygons has been stretched in the animation step and a normal map that is smooth with no wrinkles on the cloth may be used. The use of the different normal maps combined with the smooth transition mentioned above helps to provide a good dynamic wrinkled looked to the cloth as it moves.

There are many different ways that the interpolated wrinkle ratios of the rasterized pixels may be used to select normal maps. In one example the normal maps may be selected based on the interpolated wrinkle ratios falling within predetermined ranges. In another example each of the interpolated wrinkle ratios may be put through a function to calculate adjusted wrinkle ratios $WR_{adj}$. By way of example, if two normal maps are used the adjusted wrinkle ratios may be one of two different values, such as 0 or 1, if three normal maps are used the adjusted wrinkle ratios may be one of three different values, such as 0, 1 or 2, etc.

Figure 5:
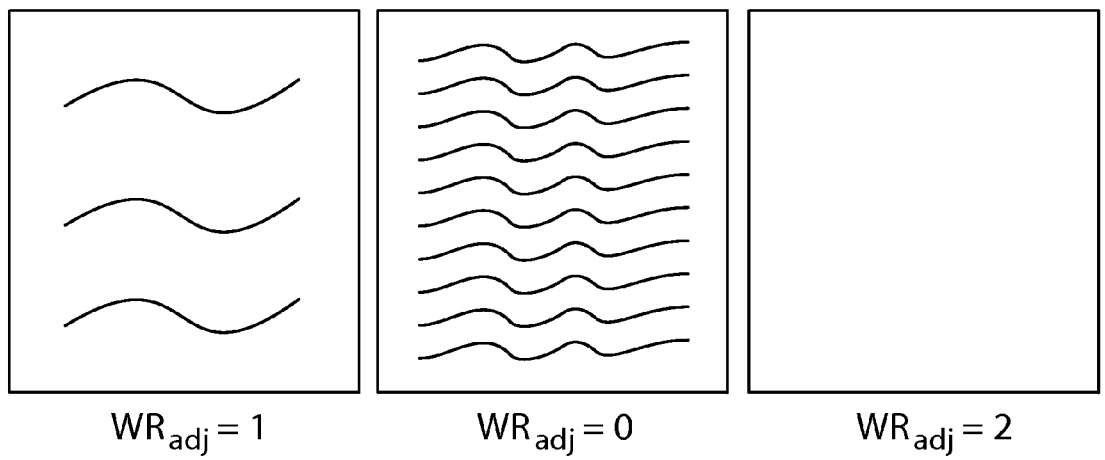
FIG. 5 is a pictorial diagram illustrating normal maps that may be used with the method shown in FIG. 2 in accordance with an embodiment of the present invention.

FIG. 5 illustrates an example of the different normal maps to which the adjusted wrinkle ratios $WR_{adj}$ may correspond for a scenario where three normal maps are used. Namely, an adjusted wrinkle ratio $WR_{adj}$ equal to 1 may correspond to just the resting texture in a normal position having only a few wrinkles, an adjusted wrinkle ratio $WR_{adj}$ equal to 0 may correspond to a normal map having the most wrinkled texture, and an adjusted wrinkle ratio $WR_{adj}$ equal to 2 may correspond to a plain normal map having no wrinkles so that the cloth appears smooth and stretched.

An example of a function for calculating adjusted wrinkle ratios $WR_{adj}$ that may be used for the scenario shown in FIG. 5 is as follows:

If $WR<0.5$, then $WR_{adj}=0$;

If $WR>1.3$, then $WR_{adj}=2$;     (3)

Else, then $WR_{adj}=1$;

It should be well understood that this is just one example and that many variations may be used in accordance with embodiments of the invention.

For example, the following portion of code provides another example of a function that may be used for calculating adjusted wrinkle ratios:

```
if (wrinkleRatio < 1)
    wrinkleRatioResult = (wrinkleRatio − wrinkleAreaMin) /
(wrinkleAreaMiddle − wrinkleAreaMin)
    else
    wrinkleRatioResult = 1 + (wrinkleRatio −
wrinkleAreaMiddle) / (wrinkleAreaMax − wrinkleAreaMiddle)
```

In this function the value "wrinkleRatio" is equal to the interpolated wrinkle ratio and "wrinkleRatioResult" is equal to the adjusted wrinkle ratio $WR_{adj}$. Furthermore, by way of example the following values for the other variables may be used: wrinkleAreaMin=0.5; wrinkleAreaMiddle=1.0; wrinkleAreaMax=1.5. Again, it should be well understood that this is just one example and that there are many different ways the adjusted vertex wrinkle ratios $WR_{adj}$ may be calculated in accordance with the present invention.

Returning to the method 40 (FIG. 2), after one or more normal maps are selected for a particular pixel, then in step 48 a value is obtained from each selected normal map for the pixel. The obtained value(s) are used for altering a surface normal of that pixel in step 50. The surface normal may be altered by, for example, replacing or modifying the surface normal of the pixel by the value obtained from the selected normal map. These steps are repeated for each rasterized pixel in the polygon mesh.

Altering the surface normal of each pixel using the value obtained from each selected normal map changes the brightness of the pixel. This can have the result of making the surface appear either more wrinkled or less wrinkled depending upon which normal map was selected for the pixel.

In accordance with an embodiment of the present invention, the value that is obtained from each selected normal map may comprise a surface normal that is used to replace the surface normal of the particular pixel. In this scenario the surface normal that is obtained will typically comprise a "tangent space lighting normal". To perform lighting, this "tangent space lighting normal" will generally need to be transformed to "world space".

This transformation may be done by storing tangent space vectors per vertex, which essentially comprises a tangent-space-to-world matrix. These matrices are then interpolated per-pixel and are used to transform the "tangent space lighting normal" into a world space normal. Once this transformation is completed the obtained surface normal can then be used to replace the surface normal of the pixel.

In accordance with various embodiments of the present invention, two normal maps may be selected for each pixel based on the wrinkle ratio and then an average calculated between the values obtained from the two selected normal maps. For example, if the wrinkle ratio is 0.7, the normal may be calculated as follows:

Normal=normalize(normal1*0.7+normal2*(0.3))

Where normal1 is the normal from normal map 1 and normal2 is the normal from normal map 2. If the wrinkle Ratio is 1.4, the normal may be calculated as follows:

Normal=normalize(normal2*0.4+normal3*(0.6))

Where normal3 is the normal from normal map 3. The use of two normal maps for each pixel gives a smooth transition between each pixel, rather than jumping from one normal map to the next. By way of example, in one embodiment only two normal maps are used for normal maps 2 and 3. Normal map 1 is implicitly (0,0,1), i.e. flat, for each pixel in the normal map.

The method 40 concludes in step 52 where the altered surface normal for each rasterized pixel in the polygon mesh is used for lighting the pixel.

Figure 6:
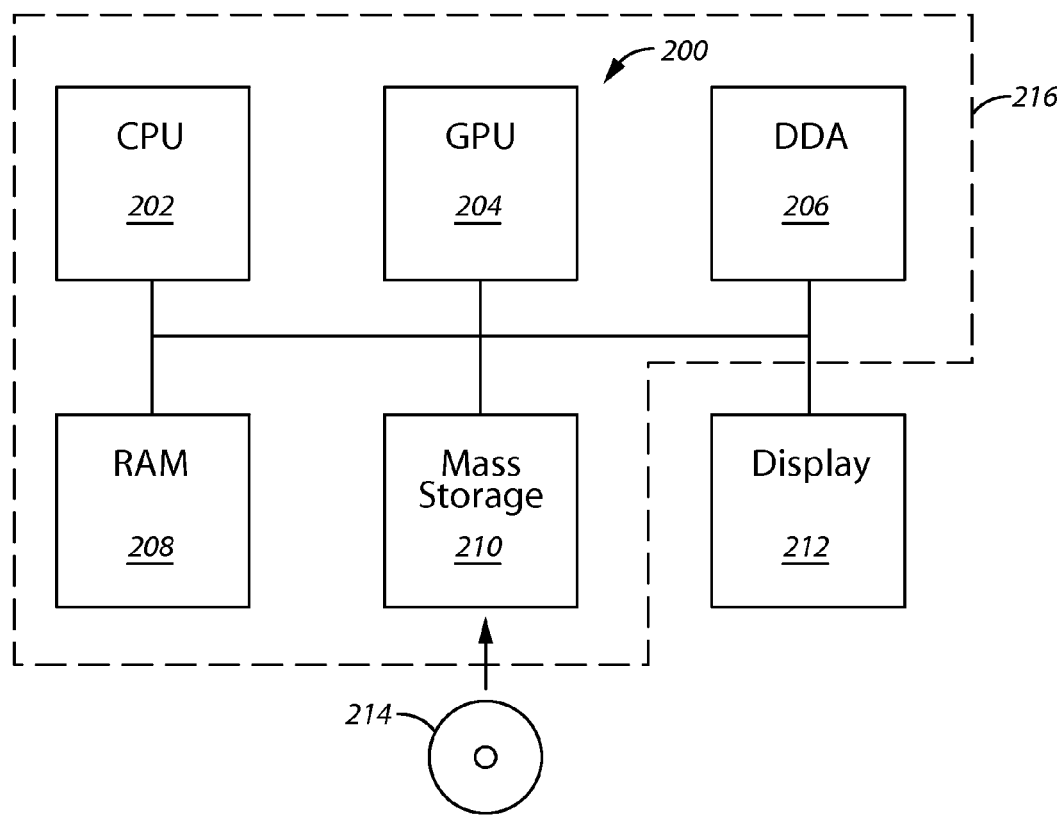
FIG. 6 is a block diagram illustrating a system that may be used to run and execute the methods shown in FIGS. 1 and 2 in accordance with embodiments of the present invention.

As mentioned above, the methods and techniques described herein may be utilized and run on many different types of computers, graphics workstations, video game systems and consoles, and the like. Referring to FIG. 6 there is illustrated such a system 200 that may be used to run the methods and techniques described herein. The system 200 includes a central processing unit (CPU) 202, a graphics processing unit (GPU) 204, digital differential analysis (DDA) hardware 206, a random access memory (RAM) 208, a mass storage unit 210, such as a disk drive, and a display monitor 212.

The CPU 202 and/or GPU 204 can be used to execute the steps of the methods and techniques described herein, and the materials that are simulated can be rendered on the display monitor 212. Removable storage media 214 may optionally be used with the mass storage unit 210, which may be used for storing code that implements the methods and techniques described herein. Either all or a portion of the system 200 may be embodied in a device 216, such as for example a computer or video game console or system. And as mentioned above, the simulations may be run concurrently with other graphics tasks. On a multi processing core, the simulations can be executed on a separate processor.

While the invention herein disclosed has been described by means of specific embodiments and applications thereof, numerous modifications and variations could be made thereto by those skilled in the art without departing from the scope of the invention set forth in the claims.

What is claimed is:

1. A method for use in simulation of a material, comprising the steps of:
    establishing a polygon mesh for the material with each polygon in the polygon mesh having a first area equal to its area in a resting position;
    animating the polygon mesh, the animation resulting in each polygon in the polygon mesh having a second area;
    for each polygon in the polygon mesh, calculating a polygon wrinkle ratio by dividing the second area by the first area;
    for each vertex in the polygon mesh, calculating a vertex wrinkle ratio as an average of the polygon wrinkle ratios for each polygon attached to the vertex; and
    using the vertex wrinkle ratios in a process of altering lighting of pixels representing polygons in the polygon mesh.

2. A method in accordance with claim 1, wherein the step of using the vertex wrinkle ratios in a process of altering lighting of pixels representing polygons in the polygon mesh comprises the steps of:
    for each polygon in the polygon mesh, rasterizing the polygon to form screen pixels;
    for each rasterized pixel in the polygon mesh, interpolating the wrinkle ratio per pixel based on the vertex wrinkle ratios; and
    for each rasterized pixel in the polygon mesh, altering a surface normal of the pixel using a value obtained from each of one or more normal maps.

3. A method in accordance with claim 2, wherein the step of using the vertex wrinkle ratios in a process of altering lighting of pixels representing polygons in the polygon mesh further comprises the step of:
    for each rasterized pixel in the polygon mesh, using the interpolated wrinkle ratio to select the one or more normal maps.

4. A method in accordance with claim 3, wherein the step of using the interpolated wrinkle ratio to select the one or more normal maps for each rasterized pixel in the polygon mesh comprises the step of:
    for each rasterized pixel in the polygon mesh, calculating an adjusted wrinkle ratio by processing the interpolated wrinkle ratio with a function.

5. A method in accordance with claim 2, wherein the step of using the vertex wrinkle ratios in a process of altering lighting of pixels representing polygons in the polygon mesh further comprises the step of:
    for each rasterized pixel in the polygon mesh, using the altered surface normal for lighting the pixel.

6. A method in accordance with claim 2, wherein the value obtained from each of the one or more normal maps comprises a surface normal.

7. A method in accordance with claim 1, wherein the step of animating the polygon mesh comprises the step of:
    animating the polygon mesh using a cloth simulation technique.

8. A method in accordance with claim 1, wherein the material comprises clothing.

9. A system for use in simulation of a material, comprising:
    means for establishing a polygon mesh for the material with each polygon in the polygon mesh having a first area equal to its area in a resting position;
    means for animating the polygon mesh, the animation resulting in each polygon in the polygon mesh having a second area;
    means for calculating a polygon wrinkle ratio for each polygon in the polygon mesh by dividing the second area by the first area;
    means for calculating a vertex wrinkle ratio for each vertex in the polygon mesh as an average of the polygon wrinkle ratios for each polygon attached to the vertex; and
    means for using the vertex wrinkle ratios in a process of altering lighting of pixels representing polygons in the polygon mesh.

10. A system in accordance with claim 9, wherein the means for using the vertex wrinkle ratios in a process of altering lighting of pixels representing polygons in the polygon mesh comprises:
    means for rasterizing each polygon in the polygon mesh to form screen pixels;
    means for interpolating the wrinkle ratio per pixel for each rasterized pixel in the polygon mesh based on the vertex wrinkle ratios; and
    means for altering a surface normal of each rasterized pixel in the polygon mesh using a value obtained from each of one or more normal maps.

11. A system in accordance with claim 10, wherein the means for using the vertex wrinkle ratios in a process of altering lighting of pixels representing polygons in the polygon mesh further comprises:
    means for using the interpolated wrinkle ratio for each rasterized pixel in the polygon mesh to select the one or more normal maps.

12. A system in accordance with claim 11, wherein the means for using the interpolated wrinkle ratio for each rasterized pixel in the polygon mesh to select the one or more normal maps comprises:
    means for calculating an adjusted wrinkle ratio for each rasterized pixel in the polygon mesh by processing the interpolated wrinkle ratio with a function.

13. A system in accordance with claim 10, wherein the means for using the vertex wrinkle ratios in a process of altering lighting of pixels representing polygons in the polygon mesh further comprises:
    means for using the altered surface normal for each rasterized pixel in the polygon mesh for lighting the pixel.

14. A system in accordance with claim 10, wherein the value obtained from each of the one or more normal maps comprises a surface normal.

15. A computer program product comprising a computer storage medium for embodying a computer program for input to a computer and a computer program embodied in the computer storage medium for causing the computer to perform steps of:
- establishing a polygon mesh for a material with each polygon in the polygon mesh having a first area equal to its area in a resting position;
- animating the polygon mesh, the animation resulting in each polygon in the polygon mesh having a second area;
- for each polygon in the polygon mesh, calculating a polygon wrinkle ratio by dividing the second area by the first area;
- for each vertex in the polygon mesh, calculating a vertex wrinkle ratio as an average of the polygon wrinkle ratios for each polygon attached to the vertex; and
- using the vertex wrinkle ratios in a process of altering lighting of pixels representing polygons in the polygon mesh.

16. A computer program product in accordance with claim 15, wherein the step of using the vertex wrinkle ratios in a process of altering lighting of pixels representing polygons in the polygon mesh comprises the steps of:
- for each polygon in the polygon mesh, rasterizing the polygon to form screen pixels;
- for each rasterized pixel in the polygon mesh, interpolating the wrinkle ratio per pixel based on the vertex wrinkle ratios; and
- for each rasterized pixel in the polygon mesh, altering a surface normal of the pixel using a value obtained from each of one or more normal maps.

17. A computer program product in accordance with claim 16, wherein the step of using the vertex wrinkle ratios in a process of altering lighting of pixels representing polygons in the polygon mesh further comprises the step of:
- for each rasterized pixel in the polygon mesh, using the interpolated wrinkle ratio to select the one or more normal maps.

18. A computer program product in accordance with claim 17, wherein the step of using the interpolated wrinkle ratio to select the one or more normal maps for each rasterized pixel in the polygon mesh comprises the step of:
- for each rasterized pixel in the polygon mesh, calculating an adjusted wrinkle ratio by processing the interpolated wrinkle ratio with a function.

19. A computer program product in accordance with claim 16, wherein the step of using the vertex wrinkle ratios in a process of altering lighting of pixels representing polygons in the polygon mesh further comprises the step of:
- for each rasterized pixel in the polygon mesh, using the altered surface normal for lighting the pixel.

20. A computer program product in accordance with claim 15, wherein the step of animating the polygon mesh comprises the step of:
- animating the polygon mesh using a cloth simulation technique.

* * * * *